No. 888,558. PATENTED MAY 26, 1908.
T. H. WALBRIDGE.
FELLY.
APPLICATION FILED OCT. 29, 1906.
3 SHEETS—SHEET 1.
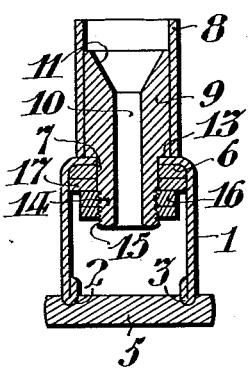
FIG. I.
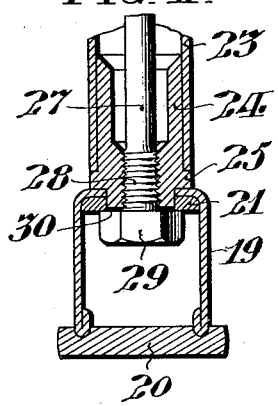
FIG. II.
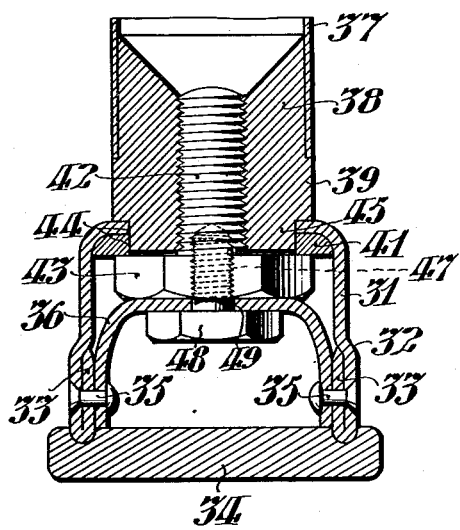
FIG. III.
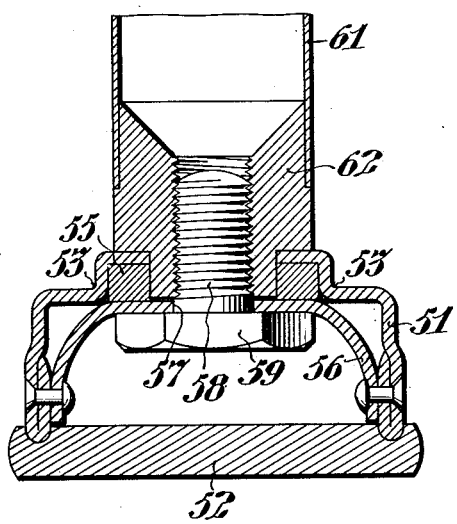
FIG. IV.
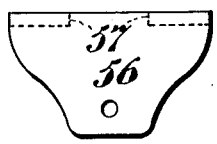
FIG. V.
WITNESSES:
Clifton C. Hallowell
Thomas H. Kerr
INVENTOR:
THOMAS H. WALBRIDGE,
by Arthur E. Paige
Atty.

No. 888,558. PATENTED MAY 26, 1908.
T. H. WALBRIDGE.
FELLY.
APPLICATION FILED OCT. 29, 1906.
3 SHEETS—SHEET 2.
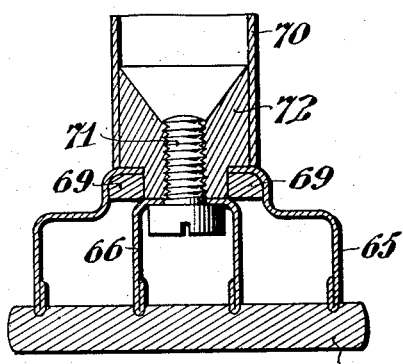
FIG. VI.
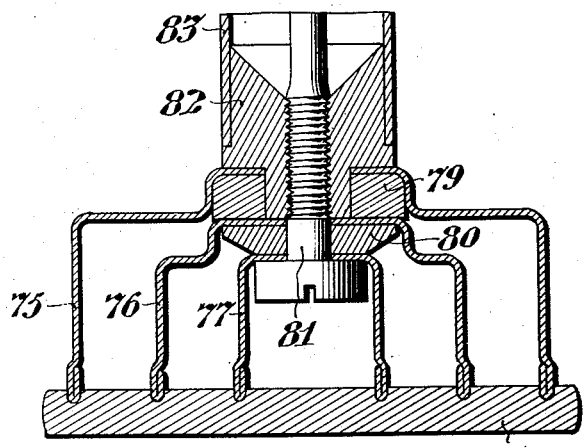
FIG. VII.
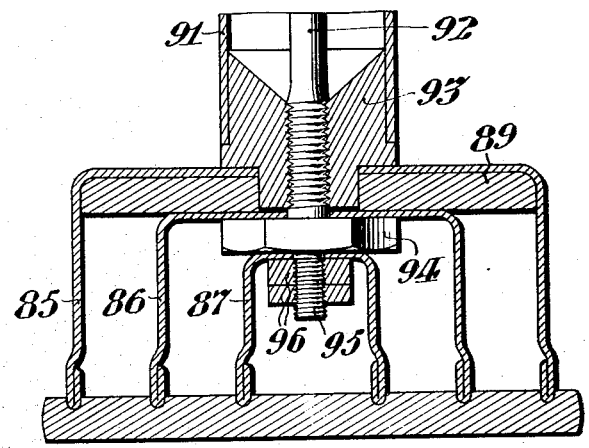
FIG. VIII.
WITNESSES:
Clifton C. Hallowell
Thomas H. Kerr
INVENTOR:
THOMAS H. WALBRIDGE,
by Arthur E. Paige
Atty.

No. 888,558. PATENTED MAY 26, 1908.
T. H. WALBRIDGE.
FELLY.
APPLICATION FILED OCT. 29, 1906.
3 SHEETS—SHEET 3.
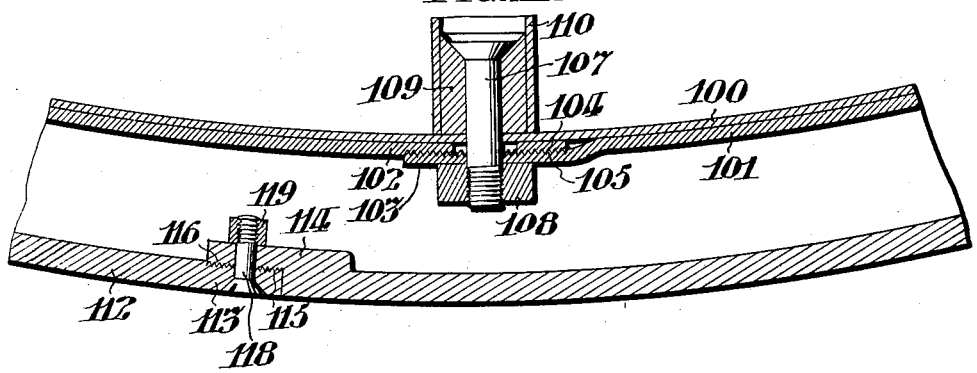
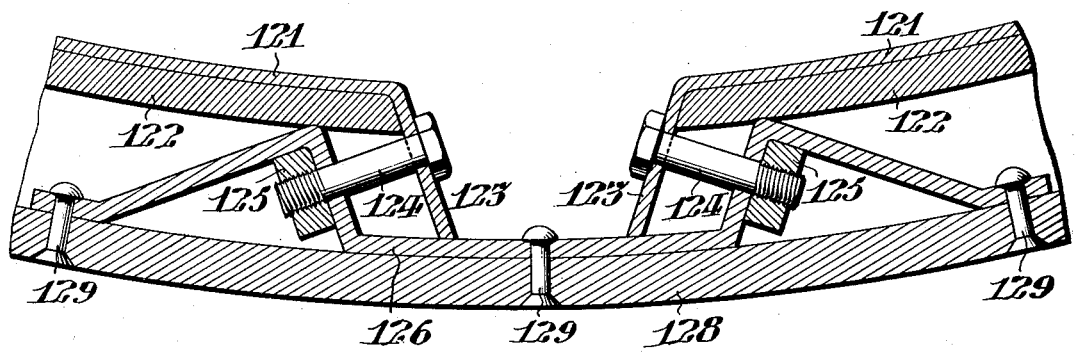
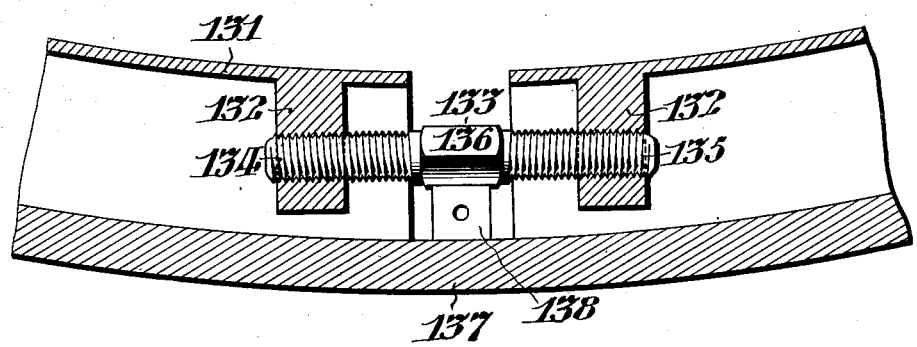
WITNESSES:
Clifton C. Hallowell
Thomas W. Kerr.
INVENTOR:
THOMAS H. WALBRIDGE,
by Arthur E. Paige,
Atty.

UNITED STATES PATENT OFFICE.

THOMAS H. WALBRIDGE, OF TOLEDO, OHIO.

FELLY.

No. 888,558.

Specification of Letters Patent.

Patented May 26, 1908.

Application filed October 29, 1906. Serial No. 340,976.

*To all whom it may concern:*

Be it known that I, THOMAS H. WALBRIDGE, of Toledo, Ohio, have invented a certain new and useful Improvement in Fellies, whereof the following is a specification, reference being had to the accompanying drawings.

My improvement is particularly adapted for embodiment in vehicle wheels comprising spokes which maintain the fellies under tension in connection with the hub, and it is an object of my invention to provide a felly formed of sheet metal so constructed and arranged as to withstand the tensile strain aforesaid in addition to the strains of impact transmitted to the felly from the tire.

As hereinafter described, my invention includes a felly comprising a channel of pressed sheet metal, of U shaped cross section, with its free edges turned outwardly for engagement with a tire which bears upon the surface traversed by the wheel, and also having what I term an internal tire, being a band of metal extending within the felly at its internal circumference and thus reinforcing it where connected with the spokes.

My invention also includes means for connecting the meeting ends of the aforesaid inner and outer tires in removable relation, and, means for expanding such a felly in an outer tire.

My invention comprises the various novel features of construction and arrangement hereinafter more definitely specified.

In said drawings: Figure I, is a transverse sectional view of a felly conveniently embodying my invention, in connection with an outer tire and spoke. Figs. II, III, and IV, are views similar to Fig. I, but showing modified forms of my invention. Fig. V, is a side elevation of the reinforcing plate shown in section in Fig. IV. Figs. VI, VII, and VIII, are views similar to Fig. I, but showing modified forms of my invention wherein the fellies each comprise a plurality of distinct metallic channels. Fig. IX, is a sectional view, taken longitudinally with respect to the felly, showing convenient arrangements of the respective meeting ends of the inner and outer tires. Fig. X, is a sectional view of the felly showing means for expanding the same in the tire. Fig. XI, is a view similar to Fig. X, but showing modified expanding means.

Referring to the form of my invention shown in Fig. I; the felly 1, is formed of a pressed sheet metal channel of U shaped cross section, having its free edges 2, and 3, turned outwardly in engagement with the tire 5. Said felly 1, is provided with the inner tire 6, which is coextensive with the internal circumference of the felly, and is provided with apertures 7, to receive the outer ends of spokes, only one of the latter being shown. As shown, the spoke comprises a tubular sheet metal body 8, provided at its outer end with the bushing 9, conveniently welded or brazed therein; said bushing having the opening 10, therethrough, the inner edge 11, of which extends obliquely with respect to the inner wall of the spoke body so as to facilitate the discharge of molten solder therefrom which otherwise might be retained after the operation of securing the bushing in the spoke. Said bushing 9, has the shoulder 13, bearing upon the inner perimeter of the felly 1, and the tenon 14, of less diameter which extends through the opening 7, in the inner tire 6, and is provided exterior to the latter with the screw thread 15, for the lock nuts 16, whereby the spoke is secured in the felly. I find it convenient to provide the reinforcing washers 17, between the tire 6, and nuts 16, local to the ends of the spokes.

Referring to the form of my invention shown in Fig. II; the felly 19, outer tire 20, and inner tire 21, are substantially like the corresponding elements of construction shown in Fig. I, but, the spoke 23, is provided with the bushing 24, having the flange 25, extending between the end of the spoke and the felly, so as to afford a shoulder of larger diameter for contact with the felly. Moreover, the connection between the spoke and the felly in Fig. II, is made by means of the bolt 27, having the screw thread 28, engaged with the bushing 24, and the head 29, overlapping the edges of the opening 30, in the inner tire 21. Said bolt 27, may be coextensive with the spoke, and be connected therewith at its inner end.

Referring to the form of my invention shown in Fig. III, the felly 31, is similar to the fellies 1, and 19, above described except that it is offset at 32, and the edges 33, thereof, which engage the tire 34, are folded inwardly to a greater extent, so that the felly is wider at its outer perimeter than at its inner perimeter, and its folded edges are of such extent as to conveniently receive rivets

35, whereby reinforcing plates 36, are connected therewith, said plates being respectively local to the spokes. As shown in Fig. III; the spoke comprises the tubular shell 37, provided at its outer end with the bushing 38, having the flange 39, extending between the end of the spoke and the felly, thus resembling the bushing 24, shown in Fig. II. Said felly 31, is provided with the inner tire 41, and the spoke 37, is secured in rigid relation therewith by the screw 42, having the head 43, overlapping the edges of the opening 44, in which extends the tenon 45, on said bushing. As shown, said head 43, extends between the inner tire 41, and the reinforcing plate 36, and, the latter is rigidly connected therewith by the screw 47, having the head 48, overlapping the edges of the opening 49, in said plate 36, through which said screw 47 extends.

In the form of my invention shown in Fig. IV; the felly 51, which is otherwise similar to the felly 31, above described, is adapted for connection with a wider tire 52, being stiffened by offsets 53, which are coextensive with the length of the felly and which are fitted to the inner tire 55. Said felly 51, has reinforcing plates 56, respectively local to the spokes; each plate being provided with an opening 57, for a screw 58, the head 59 of which overlaps the edges of said opening and retains the plate 56, tire 55, and felly 51, in rigid relation with the spoke, comprising the tubular shell 61, having the bushing 62, which is similar to the bushing 38, above described.

In the form of my invention shown in Fig. VI; the felly comprises two concentrically disposed channels 65, and 66, and is adapted for engagement with the tire 67, which is wider than that shown in Fig. V. The inner tire 69, extends between said two channels 65, and 66, and the felly is rigidly connected with the spoke 70, by the screw 71, which engages the spoke bushing 72.

In the form of my invention shown in Fig. VII; the felly comprises three concentrically disposed channels 75, 76, and 77, each engaged with the tire 78. The inner tire 79, extends between said channels 75, and 76, and the channels 76, and 77, are maintained in properly spaced relation by the washer 80, which is in concentric relation with the screw bolt 81, which engages the bushing 82, in the spoke 83, and secures them in rigid relation.

In the form of my invention shown in Fig. VIII; the felly comprises three concentrically disposed channels 85, 86, and 87, and the inner tire 89, extends between the channels 85, and 86, of the full width of the former. The felly is connected with the spoke 91, by the bolt 92, which is in screw threaded engagement with the spoke bushing 93, and has the head 94, extending between the felly channels 86, and 87. The screw threaded end 95, of said bolt extending outwardly from its head 94, is engaged by the lock nuts 96, which secure the channel 87, in rigid relation with the spoke.

Although it is to be understood that the inner and outer tires above described may be made in endless form; I find it convenient to form them in strips of metal having their meeting ends overlapped as shown in Fig. IX. In said figure, the felly comprising the channel 100, is provided with the inner tire 101, having meeting ends 102, and 103, which are provided with corrugations 104 and 105, which may be interlocked as indicated in Fig. IX, to maintain said tire of any adjusted length. Said ends may be maintained in inseparable relation by the bolt 107, and nut 108; said bolt being secured in the bushing 109, at the inner end of the spoke 110. The outer tire 112, shown in Fig. IX, has its meeting ends 113, and 114, respectively provided with corrugations 115, and 116, the end 114, of said tire 112, being offset inwardly so as to afford a continuous circular tread, both ends 113, and 114, may be secured in rigid relation by the bolt 118, and nut 119.

Although it is to be understood that continuous circular fellies may be made in accordance with the construction above described, I find it convenient to provide means for expanding within an outer tire, an incomplete annular felly of the character described, and have shown such means in Fig. X; wherein the felly comprising the channel 121, is provided with the inner tire 122, and has its ends 123, turned outwardly for respective engagement with the bolts 124. Said bolts 124, are engaged with nuts 125, supported and prevented from turning by the anchor plate 126, which may be secured in rigid relation with the outer tire 128, by any convenient means, for instance, by rivets 129. It is to be understood that the felly 121 being loosely fitted in the tire 128, may be expanded by rotation of said bolts 124, so as to fit the latter tightly.

In the form of my invention shown in Fig. XI; the felly comprising the channel 131 which is an incomplete annulus, is provided at its opposed ends with nuts 132, which are rigidly secured therein, conveniently by welding or brazing. The bolt 133, is respectively provided with right and left hand threads at its opposite ends 134, and 135, so that it may be rotated by the wrench hold 136, intermediate of its length to expand said felly into tight engagement with the tire 137. When the felly is thus expanded accidental displacement thereof may be prevented by the wedge block 138, which is interposed between the wrench hold 136, and the tire 137, so as to prevent rotation of said bolt.

I do not desire to limit myself to the precise details of construction and arrangement herein described, as it is obvious that various modifications may be made therein without departing from the scope of the following claims.

I claim:—

1. A metallic felly provided with an internal tire formed of a strip of metal having separable ends; means detachably connecting said tire ends; and, means detachably connecting said tire in contact with the inner face of said felly, substantially as set forth.

2. A metallic felly provided with an internal tire formed of a strip of metal having separable ends; means detachably connecting said tire ends, comprising interengaged corrugations in said ends; a bolt maintaining said corrugations in interlocked relation; and, means distinct from said bolt detachably connecting said tire in contact with the inner face of said felly, substantially as set forth.

3. A metallic felly comprising a plurality of concentrically disposed channels; and, means securing said channels in rigid relation, comprising screw threaded members respectively local to the outer ends of the spokes, substantially as set forth.

4. A metallic felly comprising a U shaped channel having its free edges turned outwardly, and having openings in its inner circumference for connection with spokes; reinforcing plates respectively local to said spoke openings; means connecting said plates with said felly independently of the spokes, and, means connecting said reinforcing plates with said spokes.

5. A metallic felly comprising a U shaped channel having its free edges turned outwardly and having openings in its inner circumference for connection with spokes; and, reinforcing plates respectively local to said spoke openings; said plates being of U shaped cross section and having their free ends secured in rigid relation with the free edges of said channels, substantially as set forth.

6. A metallic felly comprising a channel of U shaped cross section, said felly being an incomplete annulus; and, separate, independently rotatable, screw threaded means engaging the opposed ends of said felly, whereby the latter may be expanded in a tire, substantially as set forth.

7. A metallic felly comprising a channel of U shaped cross section, said felly being an incomplete annulus; separate screw threaded means engaging the opposed ends of said felly, whereby the latter may be expanded in a tire, comprising separate nuts; and means arranged to respectively prevent the rotation of said nuts, substantially as set forth.

8. In a felly comprising a plurality of concentrically disposed metallic channels; an inner tire extending between said channels, substantially as set forth.

9. The combination with a felly comprising a plurality of concentrically disposed metallic channels; of spoke engaging means in said felly, comprising a screw having a head extending between said channels, substantially as set forth.

10. A felly comprising a metallic channel of U shaped cross section having its outer circumference adapted to engage a tire, in combination with washers within the felly local to the regions where said felly is connected with the spokes; and, means within said channel, independent of said felly, whereby said washers are connected with said spokes, substantially as set forth.

11. A metallic felly comprising a U shaped channel having its free edges turned outwardly and having openings in its inner circumference for connection with spokes; reinforcing plates respectively local to said spoke openings; and, means connecting said plates with said channel, independently of the spokes, substantially as set forth.

12. A metallic felly provided with an internal tire formed of a strip of metal having separable ends; a spoke fitted in said felly; and, means carried by said spoke detachably connecting said tire ends, substantially as set forth.

In testimony whereof, I have hereunto signed my name at Toledo, Ohio, this seventeenth day of October, 1906.

THOMAS H. WALBRIDGE.

Witnesses:
A. C. VAN DRIESEN,
A. VAN WORMER.